Feb. 4, 1936. A. G. SCHUCK 2,029,641

SOUND PRODUCING DEVICE

Filed April 30, 1934 2 Sheets-Sheet 1

Inventor
Anthony G. Schuck
By Lyon+Lyon
Attorneys

Feb. 4, 1936.     A. G. SCHUCK     2,029,641
SOUND PRODUCING DEVICE
Filed April 30, 1934      2 Sheets-Sheet 2

Inventor
Anthony G. Schuck
By Lyon & Lyon
Attorneys

Patented Feb. 4, 1936

2,029,641

UNITED STATES PATENT OFFICE 2,029,641

SOUND PRODUCING DEVICE

Anthony G. Schuck, Los Angeles, Calif.

Application April 30, 1934, Serial No. 723,102

5 Claims. (Cl. 46—118)

This invention relates to devices for artificially producing natural sounds and more particularly to devices for imitating the sounds of animals, such as the bark of a dog, the meow of a cat, the neigh of a horse, etc.

A broad object of the invention is to provide a mechanism capable of accurately imitating certain natural sounds and a more specific object is to provide such a device which is relatively simple, can be manufactured at relatively low cost, and is reliable and durable in operation.

Another object of the invention is to provide a mechanism for imitating natural sounds which can be readily adapted to produce distinctly different types of sounds.

It is well known that different sounds produced by different animals are distinguished primarily by differences in pitch and/or volume characteristics. Thus it is found that the sounds produced by some different animals, although producing decidedly different impressions on the listener, may have substantially the same pitch characteristics but differ only in their volume characteristics. As an example, the average pitch of the cackle of a hen may be much the same as the pitch of the bark of a small dog, the differences between the two sounds residing almost entirely in the different volume characteristics. It is relatively easy to produce sounds of any desired pitch by choosing vibrating reeds of the proper characteristics. It has been much more difficult in practice to produce sounds having the volume characteristics of the corresponding natural sounds, and in some instances very elaborate and delicate apparatus has been resorted to to produce the desired effects.

In accordance with the present invention I provide an apparatus for automatically regulating the volume characteristics of a sounding device, which apparatus incorporates a cord looped about a rotating drum and adapted to be tensioned about the drum with a cam or other positive motion-controlling device for regulating the tension of the cord about the drum and controlling the driving effect of the drum on the cord by the variations in the tension of the cord about the drum. I have found that by utilizing this principle I can provide a relatively simple and inexpensive sound producing device which imitates the natural sounds of certain animals with uncanny accuracy.

A complete understanding of the invention can best be had from the following detailed description which refers to the drawings.

Figs. 3, 4, 5 and 6 are schematic diagrams illustrating cams for use in my mechanism of four different shapes for producing sounds having the volume characteristics of four distinctly different natural sounds; and Figs. 7, 8, 9 and 10 are curves showing the volume characteristics of sounds produced with a mechanism controlled by cams of the four shapes illustrated in Figs. 3, 4, 5 and 6, respectively.

Figure 1:
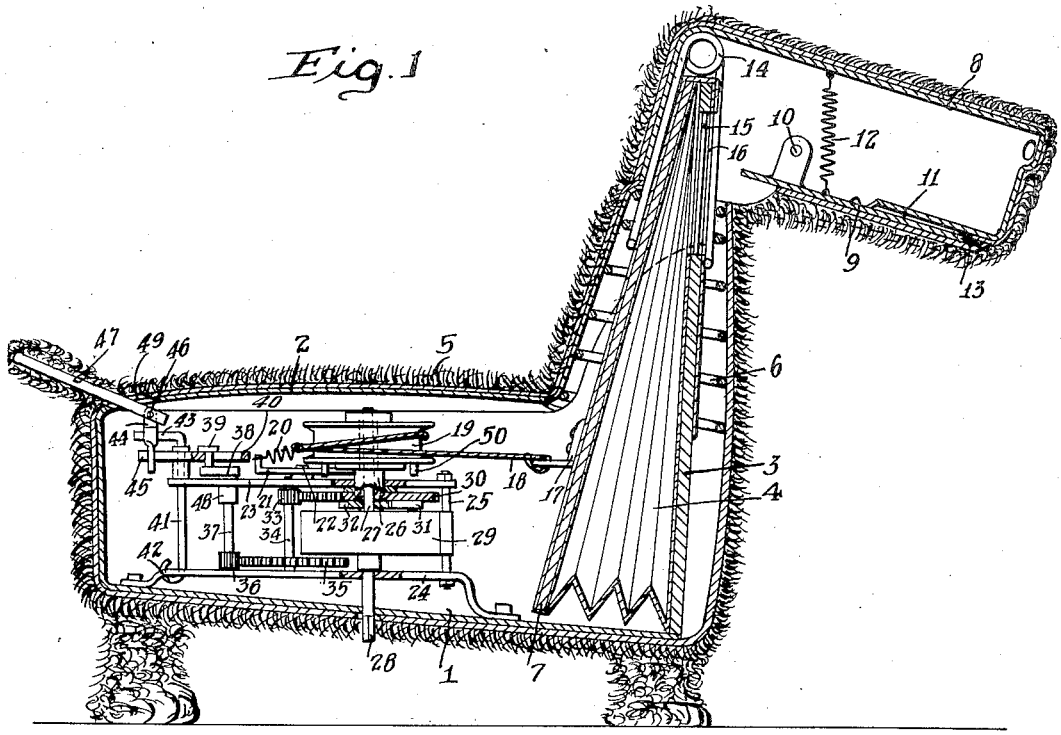
Fig. 1 is a longitudinal sectional view through a toy dog containing a sound producing mechanism in accordance with the invention.

Referring to Fig. 1, the toy dog therein depicted consists of a body frame member 1 cooperating with a cover plate 2, and the front plate 3 of a bellows 4 to form a frame work over which a suitable covering 5 of fabric or skin is stretched. The bellows 4 constitutes the supporting member for the neck and head of the animal and is surrounded by a helical spring member 6 which serves to give the neck portion of the cover 5 its proper shape and keep it away from the moving portions of the bellows 4. The bellows frame, in addition to the front plate 3, includes a rear plate 7 which is hinged to the front plate at the top. The main frame work of the head of the dog comprises a sheet metal box member 8 having a rear extension thereon which extends over the top of the bellows and is secured to the rear bellows plate 7 so that as the latter is reciprocated to produce the sound the head 8 moves up and down in synchronism therewith. The lower jaw of the dog is constituted by a plate 9 hinged as shown at point 10 to the frame member 8 and normally maintained in position to close a mouth opening 11 in the frame 8 by a spring 12. The plate 9 is preferably weighted, as shown at 13, with lead or other suitable material to give it considerable inertia so that it tends to resist sudden motion imparted to it, through the member 8. As a result, when the member 8 moves upwardly in response to forward movement of the rear bellows plate 7, the plate 9 follows the box 8 only very slowly, thereby opening the mouth while the sound is being produced (the sound being produced during the closing or forward movement of the rear bellows plate 7).

The bellows 4 is normally maintained in closed position with the rear plate 7 positioned close against the front plate 3 by a spring 14 positioned at the top thereof. Spring 14 is a helical spring extending laterally across the top of the bellows 4 and having its opposite ends extending down along the front bellows plate 3 and the rear bellows plate 7, respectively. The bellows 4 actuates a reed 15 positioned in a slit 16 in the upper portion of the front bellows plate 3, this slit being located immediately back of and in communication with the interior of the frame member 8 defining the head of the dog so that the sound issues from the mouth of the animal.

The dimensions of the slit 16 and the dimensions and characteristics of the reed 15 determine in large measure the pitch of the sound produced. Since the characteristics of reeds are well known, no detailed description of the particular types to be employed is necessary here.

The reed 15, of course, is actuated by air forced therepast from the bellows 4, the rear plate 7 of the bellows being retracted and released at a suitable rate to produce a sound of desired amplitude by the mechanism next to be described.

Secured to the rear plate 7 as by an eye 17 is a cord 18 which extends rearwardly therefrom, is looped once about a drum 19, and secured at the other end, through a short helical spring 20, to the end of a cam plate 21, the latter being pivotally attached as by a screw 22 to the upper frame plate 23 of a clockwork mechanism mounted in the rear body portion of the dog. This clockwork mechanism also comprises a lower frame plate 24, which is supported from the frame member 1 of the dog and is attached to the upper frame plate 23 by suitable pillars 25.

The drum 19 is rigidly secured to a sleeve 26, which in turn is journaled in the upper frame plate 23 of the clockwork mechanism and rotatably mounted upon a main shaft 27 which extends downwardly therethrough, and through the lower frame member 24 in which it is journaled, and is provided with a squared end 28 extending through an aperture in the frame member 1. Main shaft 27 is attached to and is surrounded by a main spring 29, the outer end of which is anchored to one of the pillars 25.

Secured to the lower end of the sleeve 26 immediately above the main spring 29 is a gear 30, and attached to gear 30 is a pawl 31 which cooperates with a ratchet wheel 32 which is rigidly secured to the shaft 27. This pawl and ratchet permits the shaft 27 to be rotated in one direction, by means of a key applied over the squared end 28, to wind the spring 29, without rotating the sleeve 26 or gear 30. However, when the shaft 27 is driven in the opposite direction by the force of the main spring 29, the pawl and ratchet wheel engage to rotate the sleeve 26, drum 19 and gear 30.

To regulate the speed of rotation of the sleeve 26 and drum 19, an escapement mechanism is provided, this mechanism comprising a pinion 33 meshing with gear 30 and mounted on a shaft 34 carrying a gear 35, which in turn meshes with a pinion 36 on a shaft 37. The upper end of shaft 37 carries a crank arm 38 having a crank pin 39 which engages with a yoke 40 (Fig. 2) pivotally mounted for oscillation on a shaft 41, which is rigidly secured to the clockwork mechanism frame members 23 and 24. Shaft 41 is prevented from turning by looping the lower end back into a recess provided therefor in the lower frame plate 24, as shown at 42. The upper end of shaft 41 is bent rearwardly to constitute a horizontal stub shaft 43 upon which a lever 44 is fulcrumed. The lower end of lever 44 is provided with a slot through which a rearward extension 45 on the yoke 40 projects. The upper end of lever 44 is hingedly attached as by a pin 46 to a flat metal strip 47 which constitutes a skeleton for the tail of the dog. To prevent noise and reduce wear, the upper end of shaft 37 is preferably supported in a rather long bushing 48 made of fiber and attached to and extending through an aperture provided therefor in the upper frame plate 23. The pin 39 is likewise preferably provided with a fiber bushing at its points of contact with the yoke 40.

When the spring 29 has been wound, by rotating the shaft 27 with a suitable key applied to the square end 28 thereof, the tension of the spring rotates the ratchet 32 in a clockwise direction (with reference to Fig. 2) under which conditions the ratchet interlocks with the pawl 31, thereby rotating the gear 30 and sleeve 26 to which the drum 19 is attached. The rotary motion of gear 30 is transmitted through the gear train comprising pinion 33, gear 35 and pinion 36 to shaft 37, causing the latter to rotate at a much greater speed than the shaft 27. Shaft 37 in rotating revolves the crank pin 39 which in turn oscillates the yoke 40 and the rear extension 45 thereon; the latter in turn oscillates the lever 44 which swings or wags the tail frame member 47. By reason of the fact that the tail has a substantial moment of inertia, the rate at which it will wag is limited and as a result the mechanism described functions as an escapement to limit the speed of rotation of the drum 19.

It will be observed that the cover plate 2 constituting the form for the back of the dog is provided with an aperture 49 through which the tail piece 47 projects. When the tail piece 47 is in the position shown in Fig. 1, it clears the edges of the aperture 49 and is free to oscillate. However, by elevating the tail toward the perpendicular, it may be made to engage with the edge of the aperture 49 and thereby prevent oscillation of the tail. This provides a convenient lock to prevent the mechanism from releasing while it is being wound.

The cam plate 21 to which the rear end of the cord 18 is resiliently attached through the spring 20, has as its function to snub the cord 18 about the drum 19, whereby the cord will be driven by the drum to displace the rear bellows plate 7 rearwardly to open up the bellows and subsequently slacken the cord about the drum so that it is released from driven relation with the drum, permitting the bellows spring 14 to force the rear bellows plate 7 forwardly to close the bellows and force the air therefrom past the reed 15 to produce the desired sound. To this end a plurality of pins 50 are provided on the under side of the drum 19, these pins projecting downwardly into the plane of the cam plate 21 so that as the drum 19 rotates in a clockwise direction the pins 50 successively engage the cam plate 21, carry it rearwardly, and then release it.

Figure 2:
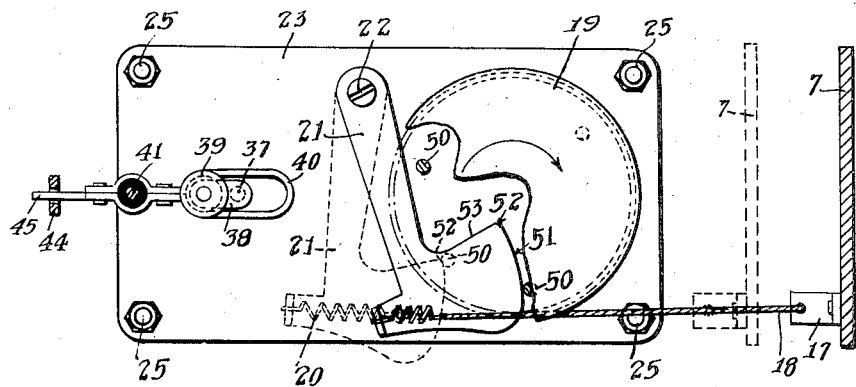
Fig. 2 is a plan view of the volume controlling portion of the mechanism disclosed by Fig. 1.
Figure 3:
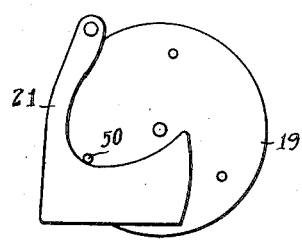
Figure 4:
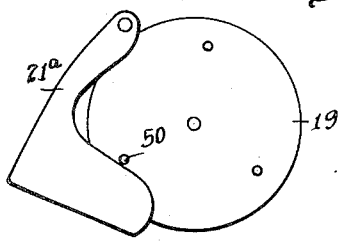

Following through this action more minutely, it will be observed that when the cam 21 is in the position shown in full lines in Fig. 2, one of the pins 50 has just contacted the face 51 of the cam. At this time the rear bellows plate 7 is in full forward position and there is only enough tension in the cord 18 to keep it from falling away from the drum 19, the tension being insufficient to produce driving engagement between the drum and cord. Therefore at this instant the drum 19 is slipping with respect to the cord 18. However, as the motion of the drum continues, the pin 50 in contact with the face 51 of the cam plate 21 shifts the latter to the left, thereby stretching the spring 20 and applying sufficient tension to the cord 18 to snub the latter about the drum 19 and cause the drum to drive the cord, thereby pulling the rear bellows plate rearwardly to open the bellows. The cam plate 21 continues its movement to the left, being driven by the pin 50, thereby maintaining the tension on the cam end of the cord 18 so that it continues to be driven by the drum. The cam plate 21 is so proportioned that the bellows has been fully opened by the time the pin 50 reaches the corner 52 of the cam. (It should be noted, however, that this opening movement of the bellows occurs so slowly that the reed 15 is not necessarily vibrated to produce a sound.) As soon as the pin 50 slips past the corner 52 of the cam the latter is released and snaps quickly back almost into the position shown in full lines in Fig. 2, its motion being retarded by contact of the cam face 53 with the pin 50 slightly before the position shown in full lines is reached. This release of the cam 21, of course, immediately releases the tension on the cam end of the cord 18, thereby permitting the cord to slip around the drum 19 and permit retraction of the rear bellows plate 7 by the spring 14 into position to close the bellows, thereby forcing the air contained in the bellows out past the reed 15 and causing the latter to produce a sound of desired characteristics.

The manner in which the mechanism described produces sounds of particular characteristics will now be explained with reference to the curves of Figs. 7, 8, 9 and 10.

Figure 7:
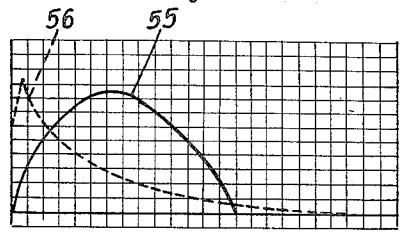

In Fig. 7 the solid-line curve 55 indicates roughly the volume characteristics of a dog bark, the volume being plotted vertically and time horizontally. It will be observed from this curve that a bark, although occurring very quickly, actually is a sound which rises from zero to maximum value and then recedes back to zero slightly more gradually. The mechanism described with reference to Figs. 1 and 2 when employing a cam of the shape shown in Fig. 2, and more accurately in Fig. 3, produces a sound having the volume characteristics indicated by curve 55 and produces an excellent imitation of a dog bark. In order, however, to obtain a sound corresponding to the curve 55, I have found it essential to use the drum 19 and the snubbing mechanism described. Thus if the cord 18, instead of being wound or looped around the drum 19, were extended straight from the bellows plate 7 to the spring 20, the sound produced in response to the release of the cam 21 has volume characteristics indicated by the dotted curve 56 in Fig. 7. In other words, the volume of the sound produced rises almost instantaneously to maximum value and then tapers off first rapidly and then more and more gradually. Thus it will be observed that the latter portion of curve 56 is concave on its upper side. The sound corresponding to curve 56 is not at all like the bark of a dog.

Figure 8:
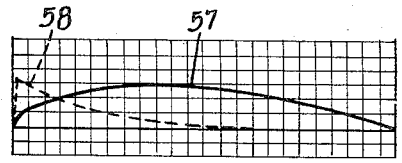

Although the device so far has been explained only with reference to a dog and the mechanism has been disclosed as incorporated within the body of a toy dog, it is to be understood that the invention is not so limited. The sound producing device itself may, of course, be incorporated in an animal of any desired shape and appearance and the sounds produced by the device may be varied greatly by merely changing the shape of the cam 21. Thus I have shown in Fig. 8 curve 57, the volume characteristics of the meow of a cat, and in Fig. 4 a cam 21a for producing such a sound. It will be observed that the curve 57 in Fig. 8 is much similar to the curve 55 in Fig. 7 except that it is flatter and of longer duration. I reduce the maximum value of the sound produced by the bellows 7 and make it last longer by using the cam of a shape shown at 21a in Fig. 4 rather than the cam 21 in Fig. 3. It will be observed that the cam 21a instead of being released suddenly by the pin 50 is released relatively gradually. It might be assumed by one unfamiliar with the operation of this device that a sound corresponding to the solid curve 57 could readily be obtained by means of the cam 21a alone without employing the drum 19 having the cord snubbed thereabout. However, if it is attempted to eliminate the drum 19 when employing a cam of the shape shown in 21a and extending the cord 18 directly from the bellows plate 7 to the spring 20, the sound obtained corresponds to the dotted curve 58 of Fig. 8, this sound rising suddenly to maximum value and then tapering off first rapidly and then less and less rapidly, much the same as curve 56 in Fig. 7.

Figure 5:
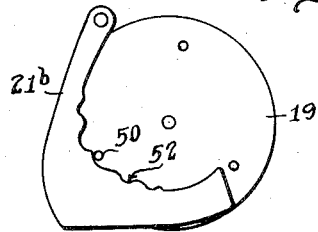
Figure 9:
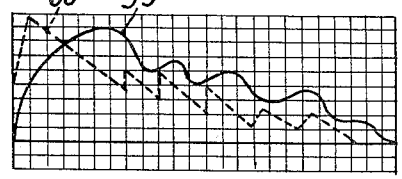

There is shown in Fig. 9 a solid-line curve 59 illustrating the volume characteristics of the neigh of a horse, and in Fig. 5 a cam 21b shaped to produce, in combination with the snubbing drum 19 as described, a sound the amplitude of which corresponds closely to the curve 59. It will be observed that the face 52 of cam 21b is somewhat serrated so that while the bellows is contracting, the cam end of the cord 18 is rapidly tensioned and released. This causes the cord to be intermittently drawn about the drum 19 and so controls the motion of the bellows plate 7 as to produce a sound having a relatively smooth, although fluctuating, volume characteristics shown by curve 59. If the drum 19 were omitted and the cord 18 extending directly from bellows plate 7 to the cam plate 21b, the volume characteristics of the sound produced would be as represented in the dotted curve 60 of Fig. 9.

Figure 6:
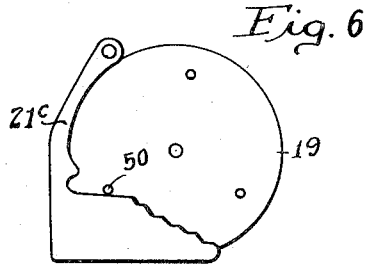
Figure 10:
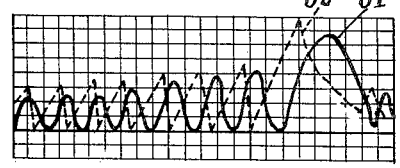

Solid-line curve 61 of Fig. 10 represents the volume characteristics of the cackle of a hen and there is shown in Fig. 6 a cam 21c cut to produce, when used in combination with the snubbing drum 19 as described, a sound corresponding in amplitude to curve 61. The dotted curve 62 in Fig. 10 illustrates the volume characteristics of the sound that would be obtained with cam 21c were the snubbing drum omitted.

All of the cams illustrated are so shaped as to at all times be moved either to tighten or slacken the cord 18. In other words, during the operation of the device the cam shown would never be stationary except possibly during the interval following release by one pin 50 prior to engagement by the next pin, at which time the cord 18 is slack and producing no control on the bellows. However, it is possible to imitate some intermittent sounds by causing the cam 21 to remain stationary for an interval after it has been moved sufficiently to initially tension the cord 18. Thus assume that in Fig. 2 the cam 21 be locked permanently in the position shown in dotted lines. Now if the drum 19 is rotated it will shift the cord 18 and retract the bellows plate 7 until the cam end of the cord becomes so slack that there is insufficient friction between the cord and the drum to produce further driving movement. Thereupon the cord will begin to slip on the drum and having once begun to slip will thereafter continue to slip more rapidly for the reason that the friction between the drum and cord when there is relative movement therebetween is less than when the cord is following the drum, in accordance with the well known principle that static friction is greater than dynamic friction. Of course, after the cord has slipped back any appreciable distance, the cam end of the cord again becomes taut, causing the cord to snub about the drum and again be driven thereby. The net result is that if the cam 21 be maintained in the position shown in dotted lines in Fig. 2 while the drum 19 is continuously rotated, the cord 18 will be intermittently tensioned and released to oscillate the bellows plate 7 and thereby produce rapidly recurring sound impulses. This arrangement can be employed successfully to imitate such sounds as a portion of the cackle of a hen. It is also to be understood that this same effect may be utilized without actually locking the cam 21 in stationary position by so designing the cam that during a portion of the relative movement between the pins 50 and the cam face the pin travels parallel to the face it contacts so that no actual movement of the cam occurs.

It is to be understood that although I have illustrated cam plates pivoted for oscillatory movement in combination with cam followers (the pins 50 which are adapted to rotate), the arrangement may be reversed in accordance with well established principles of cam design and the cam face be mounted for rotation with the drum 19 and a cam follower mounted on the end of a lever be substituted for the cams 21 shown.

My device is in no sense limited to the production of the particular sounds illustrated, these being merely indicative of the sounds of widely different characteristics that can be imitated by employing cams of suitable shape in combination with a snubbing drum as described. The invention is therefore to be limited only as set forth in the appended claims.

I claim:
1. A sound producing device comprising a spring retracted reciprocable member, which device produces a sound the volume of which is proportional to the velocity of movement of the reciprocable member, in combination with a driving mechanism comprising a drum, a cord looped about said drum and connected at one end to said spring retracted member, means for rotating said drum in a direction to tighten said one end of said cord, a cam mechanism comprising a plate member and a follower member, one of which members is coupled to said drum for movement therewith and the other of which members is connected to the other end of said cord and mounted for reciprocatory movement toward and away from said drum in response to relative movement between said cam members, whereby when said drum is rotated the cord is intermittently snubbed into driven relation with said drum to shift said spring retracted sound producing member, and slackened to slip around said drum and release said spring retracted sound producing member in a manner determined by the shape of said cam plate.

2. The combination as described in claim 1 in which a resilient connecting member is inserted between said cam member and the said other end of said cord.

3. A sound producing device comprising a spring retracted reciprocable member, which device produces a sound the volume of which is proportional to the velocity of movement of the reciprocable member, in combination with a driving mechanism comprising a drum, a cord looped about said drum and secured at one end to said spring-retracted member, means for rotating said drum in a direction to tighten said one end of said cord, and means for resiliently tensioning the said other end of said cord, whereby when said drum is rotated the said cord is intermittently snubbed into driven relation with said drum to shift said spring-retracted sound producing member against the tension of its spring and then slackened to slip around said drum and release said spring-retracted sound producing member.

4. The combination of elements as described in claim 3, in which the sound producing device comprises a reed, and a bellows for supplying air thereto, with spring means for normally retracting said bellows.

5. In a toy animal, a hollow body portion containing a spring motor and a mechanism comprising a vertical shaft coupled to said motor for rotation thereby, a crank arm and crank on said shaft, a supporting member extending vertically parallel to and rearwardly of said shaft and crank and extending horizontally rearwardly above the plane of rotation of said crank, a lever fulcrumed on the vertical portion of said supporting member and having a slot in one end engaging said crank, a second lever fulcrumed on the rearwardly extending portion of said supporting member and extending therebelow into engagement with the rear end of the first mentioned lever whereby it is reciprocated in response to reciprocation of the first mentioned lever, said second lever having attached thereto at its upper end a tail member extending rearwardly and upwardly to the exterior of said body portion through an aperture provided therefor.

ANTHONY G. SCHUCK.